(12) United States Patent  
Kataoka (10) Patent No.: US 7,948,642 B2
(45) Date of Patent: May 24, 2011

(54) OPTICAL MEASURING APPARATUS, OPTICAL MEASURING METHOD, AND OPTICAL MEASUREMENT PROCESSING PROGRAM (75) Inventor: Masanobu Kataoka, Miyazaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 12/759,159

(22) Filed: Apr. 13, 2010

(65) Prior Publication Data

US 2010/0259769 A1 Oct. 14, 2010

(30) Foreign Application Priority Data

Apr. 14, 2009 (JP) ................................. 2009-098113

(51) Int. Cl.
G01B 11/14 (2006.01)
(52) U.S. Cl. .................. 356/625; 250/559.14; 250/224; 250/559.22; 356/627; 356/456; 356/640
(58) Field of Classification Search .......... 356/625–627, 356/425, 446, 456, 606, 639, 640; 250/559.12–559.14, 559.24, 224, 559.22
See application file for complete search history.

(56) References Cited

U.S. PATENT DOCUMENTS

| 3,905,705 | A | | 9/1975 | Petrohilos |
| 4,007,992 | A | | 2/1977 | Petrohilos et al. |
| 5,617,205 | A | * | 4/1997 | Dou et al. ..................... 356/301 |
| 7,253,910 | B2 | * | 8/2007 | Takayama ................ 250/559.13 |
| 2006/0017940 | A1 | | 1/2006 | Takayama |

FOREIGN PATENT DOCUMENTS

| EP | 1619467 | 1/2006 |
| JP | 6-249618 | 9/1994 |
| JP | 2003-329432 | 11/2003 |

* cited by examiner

Primary Examiner — Gregory J Toatley
Assistant Examiner — Iyabo S Alli
(74) Attorney, Agent, or Firm — Rankin, Hill & Clark LLP

(57) ABSTRACT

An optical measuring apparatus includes a light transmission unit, a light reception unit, a measurement value calculation unit, and a correction unit. The light transmission unit forms a beam of light that focuses in a measurement area where a measurement target object is placed and scans the measurement area with the beam of light. The light reception unit receives the beam of light that has passed through the measurement area and outputs a received-light signal on the basis of the received beam of light. The measurement value calculation unit calculates a measurement value that represents the dimension of the measurement target object on the basis of the received-light signal. The correction unit corrects the measurement value on the basis of the amount of change in the strength of the received-light signal per unit of time of scanning the beam of light.

17 Claims, 7 Drawing Sheets

| MEMORY UNIT 47 | | | | |
|---|---|---|---|---|
| [DIMENSION OF MEASUREMENT TARGET OBJECT W: 1 mm] Ta(1) | | | | |
| RELATIVE RATIO OF DIFFERENCE Δ | 1.000 | 1.005 | 1.010 | 1.015 |
| CORRECTION COEFFICIENT | 1.000 | 0.994 | 0.988 | 0.983 |
| ⋮ | | | | |
| [DIMENSION OF MEASUREMENT TARGET OBJECT W: n mm] Ta(10) | | | | |
| RELATIVE RATIO OF DIFFERENCE Δ | 1.000 | 1.005 | 1.010 | 1.015 |
| CORRECTION COEFFICIENT | 1.000 | 0.998 | 0.995 | 0.992 |
| ⋮ | | | | |

OPTICAL MEASURING APPARATUS, OPTICAL MEASURING METHOD, AND OPTICAL MEASUREMENT PROCESSING PROGRAM

BACKGROUND OF THE INVENTION

1. Field of the Invention

The present invention relates to an optical measuring apparatus, an optical measuring method, and a program for optical measurement processing for measuring light that has passed through a measurement area where a measurement target object is placed.

2. Description of the Related Art

An optical measuring apparatus includes a light transmission unit and a light reception unit that are provided with a certain distance therebetween. A measurement area, which is an area where a measurement target object is positioned, is located between the light transmission unit and the light reception unit. The light transmission unit emits a collimated beam of light, that is, a parallel beam to scan the measurement area repeatedly. The light reception unit receives the beam that has passed through the measurement area. A reception signal is generated from the received beam. Then, predetermined processing is performed on the reception signal to display measurement values (e.g., the dimension of the measurement target object, the roundness thereof, and the like).

In such an optical measuring apparatus, for example, a method that is disclosed in Japanese Patent Gazette No. 4,191,953 can be used for performing correction in its vertical direction (i.e., the direction that is parallel to the scan direction). Correction data that is unique to each apparatus can be prepared and installed by means of an apparatus that is disclosed in Japanese Unexamined Patent Application Publication No. H6-249618.

However, correction in its horizontal direction (i.e., the direction that is orthogonal to the scan direction) is not performed in the optical measuring apparatus of the related art. There is a demand for an optical measuring apparatus that makes it possible to perform horizontal correction.

SUMMARY OF THE INVENTION

An advantage of some aspects of the invention is to provide an optical measuring apparatus, an optical measuring method, and a program for optical measurement processing that make it possible to perform horizontal correction.

An optical measuring apparatus according to an aspect of the invention includes: a light transmitting section that forms a beam of light that is focused in a measurement area where a measurement target object is placed and scans the measurement area with the beam of light; a light receiving section that receives the beam of light that has passed through the measurement area and outputs a received-light signal on the basis of the received beam of light; a measurement value calculating section that calculates a measurement value that represents a dimension of the measurement target object on the basis of the received-Light signal; and a correcting section that corrects the measurement value on the basis of the amount of change in strength of the received-light signal per unit of time of scanning the beam of light.

An optical measuring method according to an aspect of the invention includes: forming a beam of light that is focused in a measurement area where a measurement target object is placed and scanning the measurement area with the beam of light; calculating a measurement value that represents a dimension of the measurement target object on the basis of a received-light signal that is outputted on the basis of the beam of light that has passed through the measurement area; and correcting the measurement value on the basis of the amount of change in strength of the received-light signal per unit of time of scanning the beam of light.

A program for optical measurement processing according to an aspect of the invention causes a computer to execute a series of steps, including: forming a beam of light that is focused in a measurement area where a measurement target object is placed and scanning the measurement area with the beam of light; calculating a measurement value that represents a dimension of the measurement target object on the basis of a received-light signal that is outputted on the basis of the beam of light that has passed through the measurement area; and correcting the measurement value on the basis of the amount of change in strength of the received-light signal per unit of time of scanning the beam of light.

With the above features, it is possible to provide an optical measuring apparatus, an optical measuring method, and a program for optical measurement processing that make it possible to perform horizontal correction.

DESCRIPTION OF THE PREFERRED EMBODIMENTS

With reference to the accompanying drawings, exemplary embodiments of the present invention will now be explained in detail.

Figure 1:
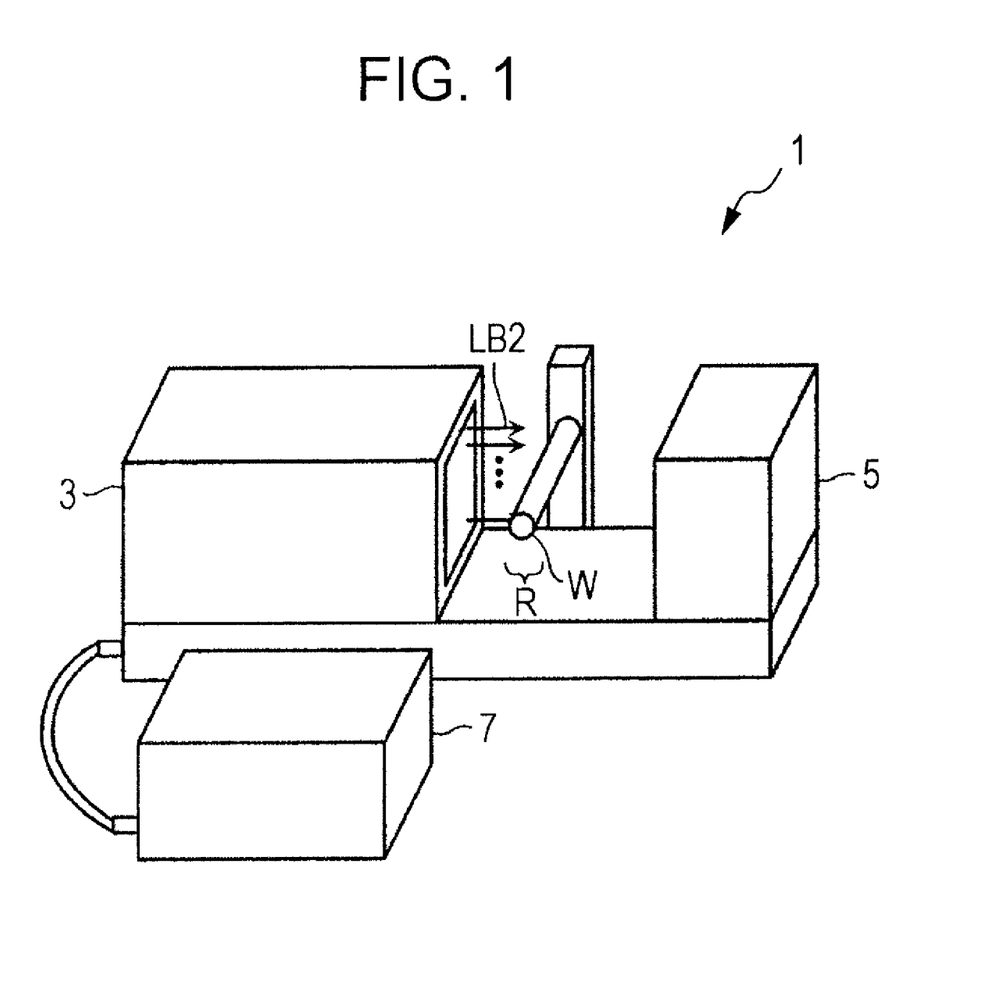
FIG. 1 is a perspective view that schematically illustrates an example of the configuration of an optical measuring apparatus according to a first embodiment of the invention.
Figure 2:
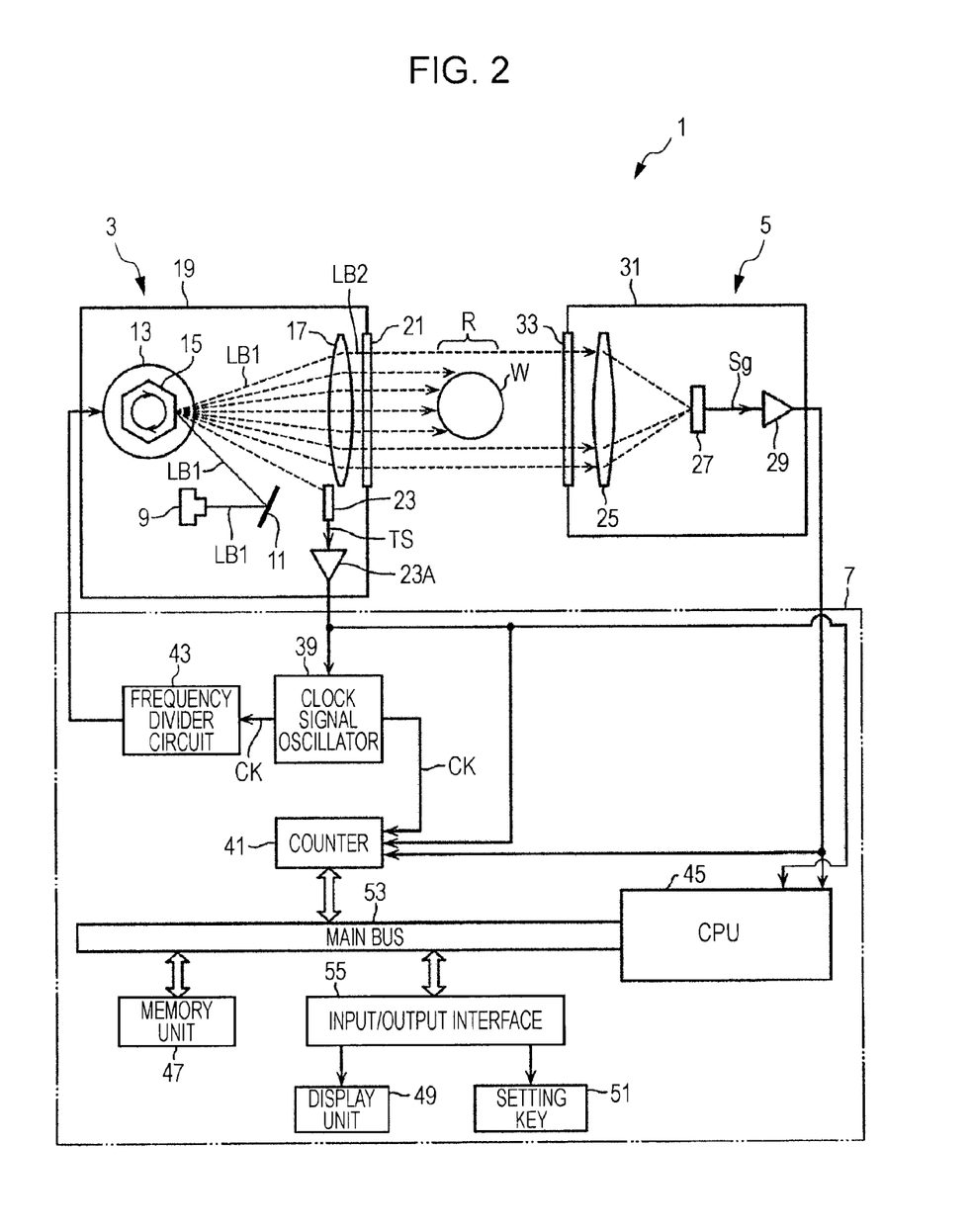
FIG. 2 is a block diagram that schematically illustrates an example of the configuration of an optical measuring apparatus according to the first embodiment of the invention.

With reference to FIGS. 1 and 2, the configuration of an optical measuring apparatus 1 according to a first embodiment of the invention is explained below. FIG. 1 is a perspective view that schematically illustrates an example of the configuration of the optical measuring apparatus 1 according to the first embodiment of the invention. FIG. 2 is a block diagram that schematically illustrates an example of the configuration of the optical measuring apparatus 1 according to the first embodiment of the invention. As illustrated in FIG. 1, the optical measuring apparatus 1 includes a light transmission unit 3, and a light reception unit 5, and a control unit 7. The light transmission unit 3 and the light reception unit 5 are provided opposite to each other. A measurement area R is located between the light transmission unit 3 and the light reception unit 5. The measurement area R is an area where a measurement target object W is positioned. The measurement area R is exposed to external atmosphere. The control unit 7 is connected to the light transmission unit 3 and the light reception unit 5 through a cable. The control unit 7 performs various kinds of control that are necessary for measurement.

The light transmission unit 3 irradiates the measurement target object W with a beam of light LB2 while scanning. The light reception unit 5 receives the beam of Light LB2. On the basis of the received light, the optical measuring apparatus 1 measures the dimension (e.g., outside diameter, width, and the like) of the measurement target object W. The optical measuring apparatus 1 corrects a measurement value D in a case where the measurement target object W is placed with a shift in the horizontal direction (i.e., the direction that is orthogonal to the scan direction) from the measurement area R. A feature of an optical measuring apparatus according to the first embodiment of the invention lies in such horizontal correction. The measurement value D represents the dimension of the measurement target object W in the scan direction of the beam of light LB2.

The light transmission unit 3 forms the beam of light LB2, which is focused in the measurement area R. The light transmission unit 3 scans the measurement area R with the beam of light LB2. As illustrated in FIG. 2, the light transmission unit 3 includes a light emitting element 9, a mirror 11, a motor 13, a polygon mirror 15, a collimator Lens (f–θ lens) 17, a cabinet 19, a timing photodiode 23, and an amplifier 23A. For example, the light emitting element 9 is a semiconductor laser diode. The mirror 11 reflects a beam of light LB1 emitted from the light emitting element 9. While being rotated by the motor 13 at a high speed in the direction shown by a circular arrow, the polygon mirror 15 reflects the beam of light LB1 reflected by the mirror 11. The collimator lens 17 gathers rays of the light LB1 reflected by the polygon mirror 15. The beam of light LB1 turns into the beam of light LB2 when it passes through the collimator lens 17. The light transmission unit 3 having the above configuration emits the beam of light LB2 to scan the measurement area R in the vertical direction with a constant speed while rotating the polygon mirror 15. The beam of light LB2 focuses in the measurement area R because it has gone through the collimator lens 17.

The cabinet 19 is a casing in which the light emitting element 9, the mirror 11, the motor 13, the polygon mirror 15, the collimator lens 17, the timing photodiode 23, and the amplifier 23A are provided. A protective glass plate 21 is fitted as a part of a side of the cabinet 19. The protective glass plate 21 is fitted at a position where it faces the collimator lens 17. Accordingly, the beam of light LB2 passes through the protective glass plate 21 to propagate toward the measurement area R. The timing photodiode 23 is provided outside the effective scan range of the beam of light LB1 reflected by the polygon mirror 15. The timing photodiode 23 detects the start or end of a single scan operation. The timing photodiode 23 outputs a timing signal TS to the amplifier 23A on the basis of the detected start or end of a single scan operation. The amplifier 23A amplifies the timing signal TS to output the amplified signal to the control unit 7.

The light reception unit 5 receives the beam of light LB2. Upon receiving the beam of light LB2, the light reception unit 5 outputs a reception signal (i.e., received-light signal) Sg. As illustrated in FIG. 2, the light reception unit 5 includes a condenser lens 25, a light receiving element 27, an amplifier 29, a cabinet 31, and a protective glass plate 33. The condenser lens 25 condenses the beam of light LB2 that has passed through the scan area R. The light receiving element 27 receives the beam of light LB2 condensed by the condenser lens 25. The light receiving element 27 outputs the reception signal Sg. The amplifier 29 amplifies the reception signal Sg. The cabinet 31 is a casing in which the condenser lens 25, the light receiving element 27, and the amplifier 29 are provided. The protective glass plate 33 is fitted as a part of a side of the cabinet 31. The protective glass plate 33 is fitted at a position where it faces the condenser lens 25. Accordingly, the beam of light LB2 that has passed through the measurement area R passes through the protective glass plate 33 first. Then, the beam of light LB2 enters the condenser lens 25 as incident light.

As illustrated in FIG. 2, the control unit 7 includes a clock signal oscillator 39, a counter 41, and a frequency divider circuit 43. The clock signal oscillator 39 receives the timing signal TS amplified by the amplifier 23A as an input signal. On the basis of the input signal, the clock signal oscillator 39 outputs a clock signal CK. The counter 41 receives the reception signal Sg amplified by the amplifier 29, the clock signal generated by the clock signal oscillator 39, and the timing signal TS amplified by the amplifier 23A as input signals. The counter 41 counts the clock signal CK on the basis of a change in the reception signal Sg, which occurs when, for example, the measurement target object W blocks the beam of light LB2 during the scanning of the measurement area R including the measurement target object W by means of the beam of light LB2. The frequency divider circuit 43 receives the clock signal CK sent from the clock signal oscillator 39 as an input signal. A signal outputted from the frequency divider circuit 43 is used for synchronization of rotation of the motor 13.

As illustrated in FIG. 2, the control unit 7 includes a CPU 45, a memory unit 47, a display unit 49, a setting key 51, a main bus 53, and an input/output interface 55. The CPU 45 receives the reception signal Sg sent from the amplifier 29 and the timing signal TS sent from the amplifier 23A as input signals. The CPU 45 performs various kinds of control that are necessary for measurement on the basis of the received signals. The CPU 45 calculates the measurement value D, which represents the dimension of the measurement target object W, on the basis of the reception signal Sg. In addition, the CPU 45 corrects the measurement value D on the basis of the amount of change in the strength of the reception signal Sg per unit of time of scanning the beam of light LB2 (i.e., inclination). More specifically, the CPU 45 corrects the measurement value D on the basis of the signal strength slope of the reception signal Sg that appears at the time when the beam of light LB2 starts to shine on the measurement target object W.

The memory unit 47 stores various data, programs, and the like that are necessary for measurement. The display unit 49 displays the measurement value D. The setting key 51 is used for inputting various setting values or the like that are necessary for measurement. The main bus 53 electrically connects the CPU 45, the memory unit 47, and the counter 41 to one another. The input/output interface 55 connects the display unit 49 and the setting key 51 to the main bus 53.

Figure 3:
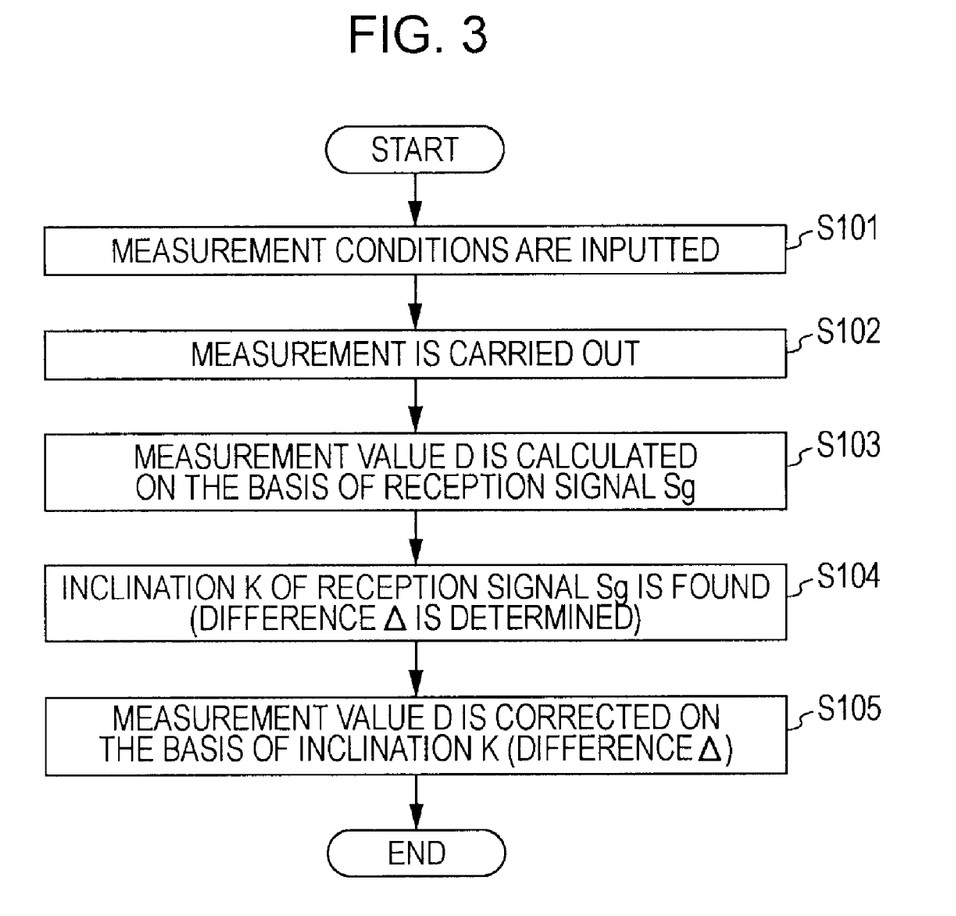
FIG. 3 is a flowchart that schematically illustrates an example of the operation of an optical measuring apparatus according to the first embodiment of the invention.

Next, the operation of the optical measuring apparatus 1 according to the first embodiment of the invention is explained below. FIG. 3 is a flowchart that schematically illustrates an example of the operation of the optical measuring apparatus 1 according to the first embodiment of the invention. The operation illustrated in FIG. 3 is performed at the control unit 7 when the CPU 45 reads various programs out of the memory unit 47 and executes the read programs.

As a first step, the control unit 7 accepts an input of measurement conditions through the operation of the setting key 51 as illustrated in FIG. 3 (step S101). Next, the control unit 7 carries out measurement (step S102). Then, the control unit 7 calculates the measurement value D on the basis of the reception signal Sg (step S103).

Thereafter, the control unit 7 finds the inclination K of the reception signal Sg (step S104). Herein, the inclination K represents the amount of change in the strength of the reception signal Sg per unit of time of scanning the beam of light LB2. Next, the control unit 7 corrects the measurement value D on the basis of the inclination K (step S105). The operation of the control unit 7 ends upon the completion of measurement value correction.

Figure 4:
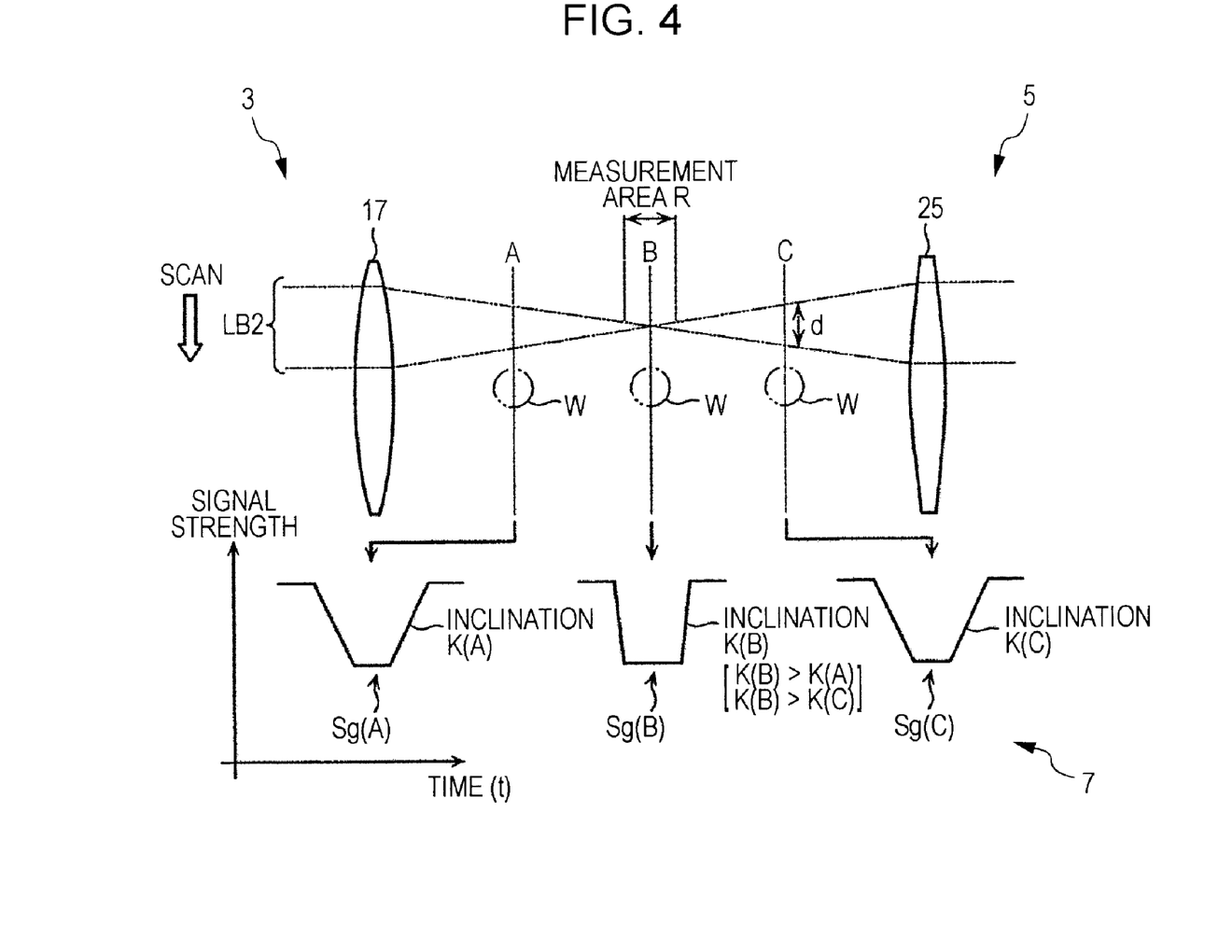
FIG. 4 is a diagram that schematically illustrates an example of the measurement of an optical measuring apparatus according to the first embodiment of the invention.

Next, with reference to FIG. 4, the above steps S102 and S103 are explained in more detail below. In this exemplary embodiment of the invention, it is assumed that the measurement target object W has a cylindrical shape as illustrated in FIG. 4. The direction of the length of the measurement target object W is perpendicular to the sheet face of FIG. 4. FIG. 4 is a diagram that schematically illustrates an example of the measurement of the optical measuring apparatus 1 according to the first embodiment of the invention. As illustrated in FIG. 4, the measurement area R is scanned with the beam of light LB2. The beam of light LB2 that has passed through the measurement area R is detected. The above measurement step (step S102) is performed as a result of detection of the scan beam LB2. The waveform (each of Sg(A), Sg(B), and Sg(C)) of the reception signal Sg has a sag, that is, is "concave downward" in accordance with the shape of the measurement target object W as illustrated in FIG. 4. The measurement value D is calculated as a result of the analysis of such a downward concave waveform of the reception signal Sg (step S103).

Figure 5:
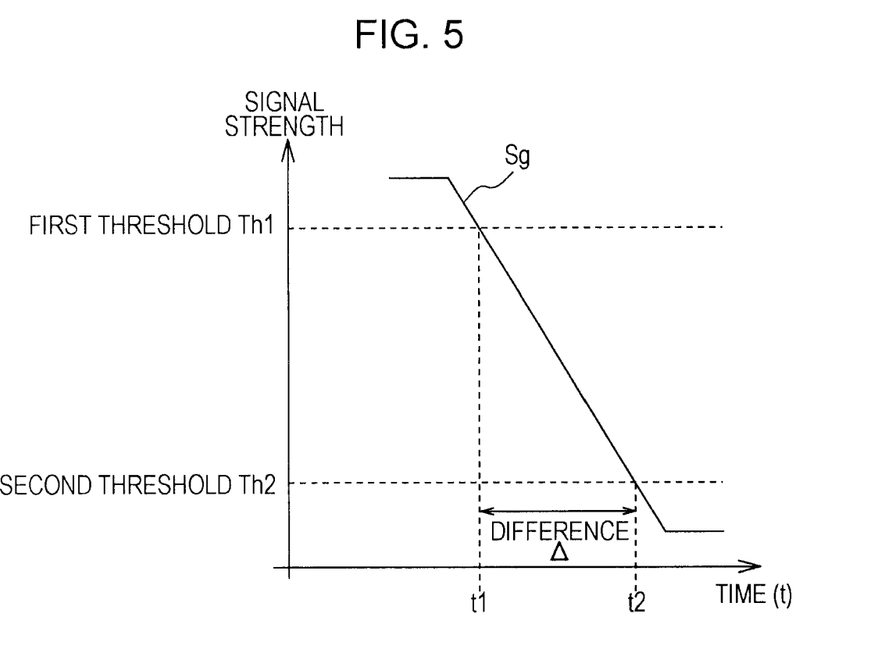
FIG. 5 is an enlarged view that schematically illustrates an example of a reception signal according to the first embodiment of the invention.

Next, with reference to FIGS. 4 and 5, the above step S104 is explained in more detail below. FIG. 5 is an enlarged view that schematically illustrates an example of the reception signal Sg according to the first embodiment of the invention. As explained earlier, the focus of the beam of light LB2 is set in the measurement area R by the collimator lens 17. For this reason, the diameter of the beam of light LB2 is smallest a position B (focal position) in the measurement area R. The diameter of the beam of light LB2 increases as a distance from the position B increases. Therefore, for example, the diameter of the beam of light LB2 at each of positions A and C, which are away from the position B, is larger than that at the position B.

Let the reception signal Sg obtained through measurement when the measurement target object W is placed at the position A, B, C be denoted as Sg(A), Sg(B), Sg(C), respectively. The inclination K of the reception signal Sg (the inclination K(A) of the reception signal Sg(A), the inclination K(B) of the reception signal Sg(B), and the inclination K(C) of the reception signal Sg(C)) varies depending on the diameter d of the beam of light LB2, which varies depending on the distance from the focal position. The inclination K of the reception signal Sg has the following relationships: K(B)>K(A), and K(B)>K(C).

For example, the control unit 7 sets a half (50%) of the signal strength of the reception signal Sg as a threshold value. The control unit 7 renders the reception signal Sg into a binary form on the basis of the threshold value. Then, the control unit 7 counts the clock signal CK to calculate the measurement value D on the basis of the binary reception signal Sg. Therefore, the measurement value D is theoretically not susceptible to effects due to a change in the diameter d of the beam of light LB2. However, the measurement value D is actually susceptible to effects due to a change in the diameter d of the beam of light LB2 because of scattering/variation in threshold setting, optical reasons/factors, and the like.

The inclination K is determined as follows. As illustrated in FIG. 5, the control unit 7 sets a first threshold value Th1 and a second threshold value Th2 (Th1>Th2) for the signal strength of the reception signal Sg. Then, the control unit 7 memorizes a point in time t1 at which the signal strength of the reception signal Sg reaches the first threshold value Th1 and a point in time t2 at which the signal strength of the reception signal Sg reaches the second threshold value Th2. Next, the control unit 7 calculates a difference Δ between the point in time t1 and the point in time t2. The difference Δ represents a length of time from the point in time (t1) at which the signal strength of the reception signal Sg reaches the first threshold value Th1 and the point in time (t2) at which the signal strength of the reception signal Sg reaches the second threshold value Th2. The inclination K is found on the basis of the difference Δ. That is, the difference Δ indicates how far the measurement target object W is from the position B, which is the focal position.

Figure 6:
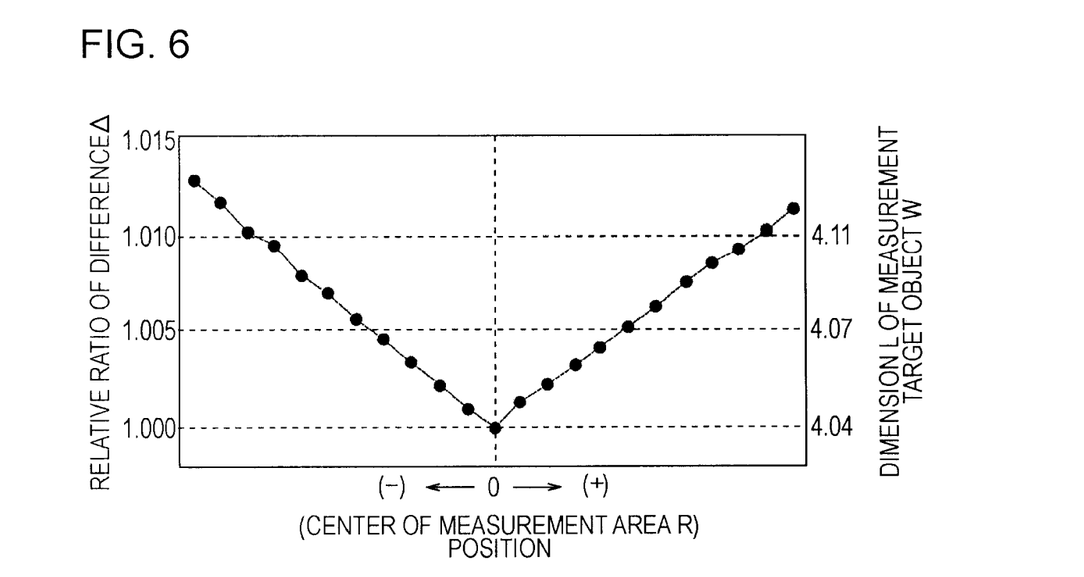
FIG. 6 is a diagram that schematically illustrates an example of the relative ratio of a difference in relation to the position of a measurement target object and the dimension of the measurement target object in relation thereto according to the first embodiment of the invention.
Figure 7:
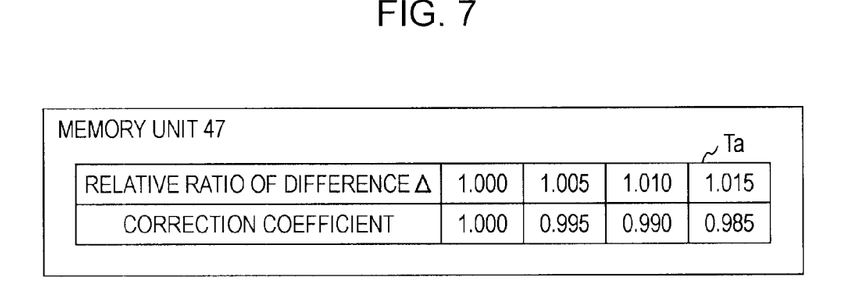
FIG. 7 is a diagram that schematically illustrates an example of a table that is stored in a memory unit according to the first embodiment of the invention.

Next, with reference to FIGS. 6 and 7, the above step S105 is explained in more detail below. FIG. 6 is a diagram that schematically illustrates an example of the relative ratio of the difference Δ in relation to the position of the measurement target object W and the dimension L of the measurement target object W in relation thereto according to the first embodiment of the invention. The horizontal axis of FIG. 6 represents the position of the measurement target object W in the horizontal direction. The center of the measurement area R (i.e., focal position) is taken as zero. The vertical axis of FIG. 6 represents the ratio of the difference Δ at respective positions to the difference Δ at the position "0" (i.e., the relative ratio of the difference Δ) and further represents the dimension L of the measurement target object W. FIG. 7 is a diagram that schematically illustrates an example of a table Ta that is stored in the memory unit 47 according to the first embodiment of the invention.

As illustrated in FIG. 6, the relative ratio of the difference Δ increases as the distance between the position of the measurement target object W and the center of the measurement area R (i.e., focal position) increases. In like manner, the dimension L of the measurement target object W increases as the distance between the position of the measurement target object W and the center of the measurement area R increases. In association with the above relationships, the memory unit 47 of the control unit 7 stores the table Ta, which contains a set of correction coefficients for the measurement value D that corresponds to the relative ratio of the difference Δ as illustrated in FIG. 7. The correction coefficient can be expressed by the following equation 1.

Correction Coefficient=Measurement Value at Focal Position/Measurement Value at Position Shifted from Focal Position     (Equation 1)

The table Ta is prepared on the basis of the error rate of the measurement value D relative to the pre-calculated difference Δ. For example, when the table Ta is prepared, measurement is performed each time when the position of the measurement target object W is shifted away from the focal position by a unit shift of 1 mm.

The control unit 7 looks up the table Ta shown in FIG. 7 to find a correction coefficient that corresponds to the relative ratio of the difference Δ and then corrects the measurement value D in accordance with the following equation 2.

Measurement Value After Correction=Measurement Value Before Correction×Correction Coefficient Corresponding to Relative Ratio of Difference Δ in Table *Ta*  (Equation 2)

The optical measuring apparatus 1 according to the first embodiment of the invention is capable of correcting the measurement value D on the basis of the inclination K (the difference Δ). That is, the optical measuring apparatus 1 can perform correction on the basis of the amount of a shift in the position of the measurement target object W in the horizontal direction. Therefore, even when the measurement target object W is displaced from the measurement area R (that is, even when a shift in position from the focal position occurs) during measurement due to vibration or other reasons, the optical measuring apparatus 1 can carry out measurement with high precision.

In addition, the optical measuring apparatus 1 according to the first embodiment of the invention is capable of detecting a focal position on the basis of the inclination K (the difference Δ).

Moreover, since the optical measuring apparatus 1 according to the first embodiment of the invention performs correction through processing performed by the control unit 7, it is not necessary to change an existing hardware configuration. Thus, it is possible to manufacture the optical measuring apparatus 1 easily at low cost.

Figure 8:
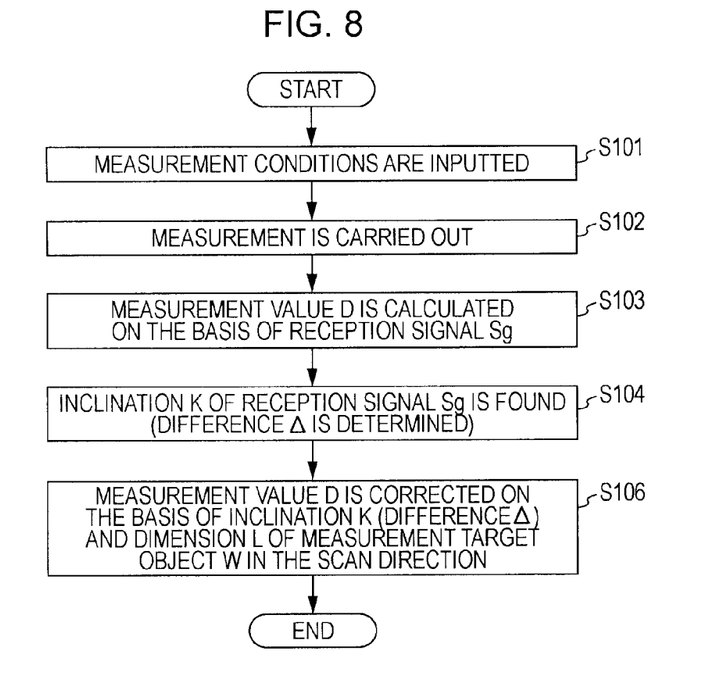
FIG. 8 is a flowchart that schematically illustrates an example of the operation of an optical measuring apparatus according to a second embodiment of the invention.
Figure 9:
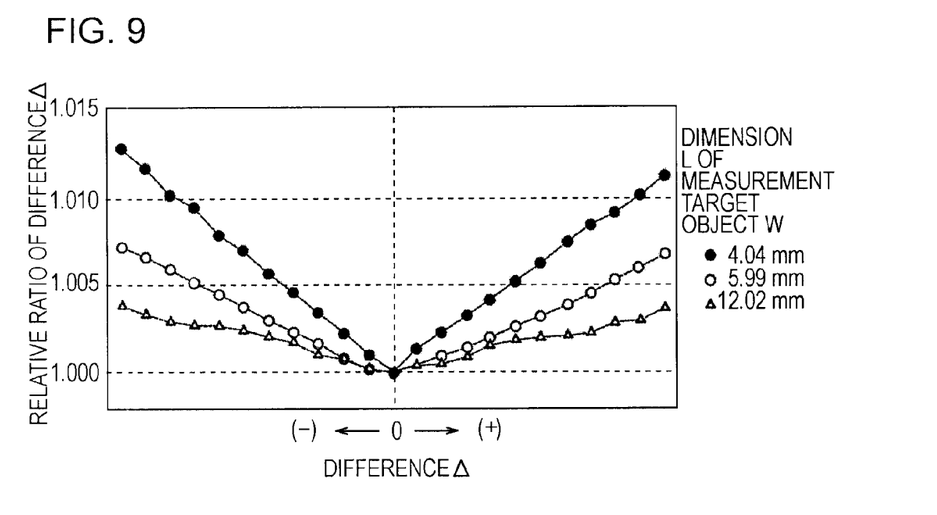
FIG. 9 is a diagram that schematically illustrates an example of the error rate of a measurement value for the measurement target object relative to the difference according to the second embodiment of the invention.
Figure 10:
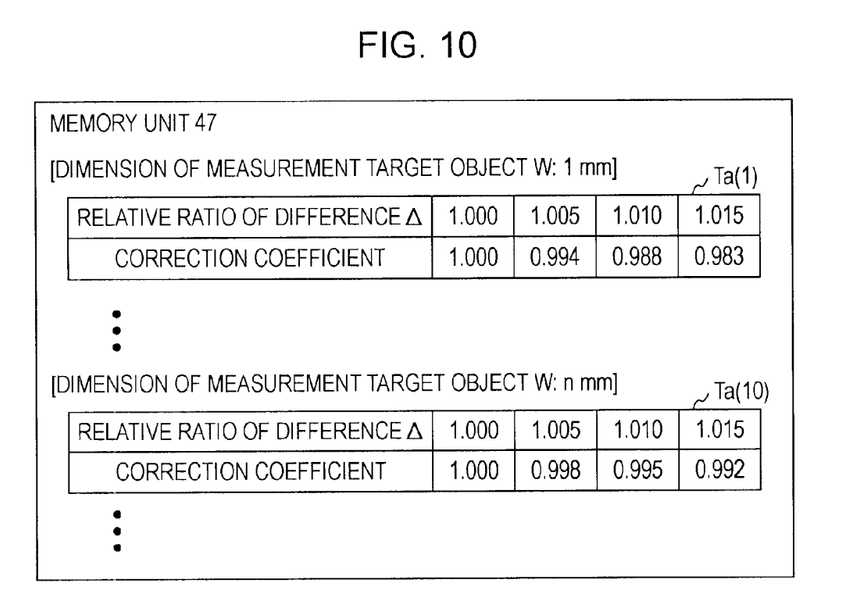
FIG. 10 is a diagram that schematically illustrates an example of tables that are stored in the memory unit according to the second embodiment of the invention.

Next, with reference to FIGS. 8, 9, and 10, the operation of an optical measuring apparatus according to a second embodiment of the invention is explained below. FIG. 8 is a flowchart that schematically illustrates an example of the operation of an optical measuring apparatus according to the second embodiment of the invention. FIG. 9 is a diagram that schematically illustrates an example of the error rate of the measurement value D for the measurement target object W relative to the difference Δ according to the second embodiment of the invention. FIG. 10 is a diagram that schematically illustrates an example of tables Ta(1) to Ta(n) that are stored in the memory unit 47 according to the second embodiment of the invention. In the following description of an optical measuring apparatus according to the second embodiment of the invention, the same reference numerals are consistently used for the same components and the like as those of an optical measuring apparatus according to the first embodiment of the invention so as to omit any redundant explanation.

As illustrated in FIG. 8, in the operation of an optical measuring apparatus according to the second embodiment of the invention, the measurement value D is corrected on the basis of the inclination K and the dimension L of the measurement target object W in the scan direction (step S106) instead of processing in the step S105 of the first embodiment of the invention. The operation of an optical measuring apparatus according to the second embodiment of the invention ends upon the completion of measurement value correction.

As illustrated in FIG. 9, an error rate increases as the difference Δ increases, as is the case with the first embodiment of the invention. In addition, as illustrated in FIG. 9, an increase in the error rate varies depending on the dimension L of the measurement target object W (dimension in the scan direction). In association with the above relationships, the memory unit 47 of the control unit 7 stores a plurality of tables Ta(1) to Ta(n), each of which corresponds to the dimension L of the measurement target object W as illustrated in FIG. 10. Each of the tables Ta(1) to Ta(n) contains a set of correction coefficients for the measurement value D that corresponds to the relative ratio of the difference Δ. The control unit 7 looks up the plurality of tables Ta(1) to Ta(n) shown in FIG. 10, each of which corresponds to the dimension L of the measurement target object W, and corrects the measurement value D.

An optical measuring apparatus according to the second embodiment of the invention corrects the measurement value D by using the table corresponding to the dimension L of the measurement target object W. Therefore, it is possible to perform correction in a wider range with higher precision in comparison with an optical measuring apparatus according to the first embodiment of the invention.

Although exemplary embodiments of the present invention are described above, needless to say, the invention is not restricted to the exemplary embodiments described herein; the invention can be implemented in a variety of variations, modifications, additions, or the like without departing from the gist, the spirit, and the scope thereof.

For example, in the first embodiment of the invention, in some cases, the table Ta might not contain a correction coefficient that corresponds to the relative ratio of the difference Δ obtained through measurement. In such a case, the control unit 7 may use a linear interpolation method to perform correction. In linear interpolation, two relative-ratio values of the difference Δ stored in the table Ta that are proximate to the value of the relative ratio of the difference Δ obtained through measurement are used.

For example, in the second embodiment of the invention, in some cases, the table that corresponds to the dimension L of the measurement target object W might not be included in the plurality of tables Ta(1) to Ta(n). In such a case, the control unit 7 may use two tables Ta(k) and Ta (k+1) that correspond to values that are proximate to the value of the dimension L of the measurement target object W and perform correction by a linear interpolation method.

For example, in the foregoing exemplary embodiments of the invention, the tables Ta, Ta(1) to Ta(n) are stored in the memory unit 47 of the control unit 7. However, it is not always necessary for the tables Ta, Ta(1) to Ta(n) to be stored in the memory unit 47 of the control unit 7. For example, the tables Ta, Ta(1) to Ta(n) may be stored in a computer (arithmetic processing unit) that is provided outside an optical measuring apparatus. The external computer may perform a part of processing that is performed by the control unit 7 according to the foregoing exemplary embodiments of the invention.

What is claimed is:

1. An optical measuring apparatus comprising:

a light transmitting section that forms a beam of light that focuses in a measurement area where a measurement target object is placed and scans the measurement area with the beam of light;

a light receiving section that receives the beam of light that has passed through the measurement area and outputs a received-light signal on the basis of the received beam of light;

a measurement value calculating section that calculates a measurement value that represents dimension of the measurement target object on the basis of the received-light signal; and a correcting section that corrects the measurement value on the basis of an amount of change in strength of the received-light signal per unit of time of scanning the beam of light at least at a focal position of the beam of light and at a first position that is closer to the light transmitting section or the light receiving section than the focal position.

2. The optical measuring apparatus according to claim 1, wherein the correcting section detects a first point in time at which the strength of the received-light signal becomes equal to a first threshold value and a second point in time at which the strength of the received-light signal becomes equal to a second threshold value as the measurement area is scanned with the beam of light, and finds the amount of change on the basis of the first point in time and the second point in time.

3. The optical measuring apparatus according to claim 1, wherein the correcting section corrects the measurement value on the basis of the dimension of the measurement target object in a scan direction of the beam of light.

4. The optical measuring apparatus according to claim 2, wherein the correcting section corrects the measurement value on the basis of the dimension of the measurement target object in a scan direction of the beam of light.

5. An optical measuring method comprising the steps of:
forming a beam of light that focuses in a measurement area where a measurement target object is placed and scanning the measurement area with the beam of light;
calculating a measurement value that represents a dimension of the measurement target object on the basis of a received-light signal that is outputted on the basis of the beam of light that has passed through the measurement area; and
correcting the measurement value on the basis of an amount of change in strength of the received-light signal per unit of time of scanning the beam of light at least at a focal position of the beam of light and at a first position that is closer to the light transmitting section or the light receiving section than the focal position.

6. A program for optical measurement processing, the program being stored in computer memory and causing a computer to execute:
forming a beam of light that focuses in a measurement area where a measurement target object is placed and scanning the measurement area with the beam of light;
calculating a measurement value that represents a dimension of the measurement target object on the basis of a received-light signal that is outputted on the basis of the beam of light that has passed through the measurement area; and
correcting the measurement value on the basis of an amount of change in strength of the received-light signal per unit of time of scanning the beam of light at least at a focal position of the beam of light and at a first position that is closer to the light transmitting section or the light receiving section than the focal position.

7. The optical measuring apparatus according to claim 2, wherein the correcting section calculates a difference between the first point in time and the second point in time at least at the focal position and the first position.

8. The optical measuring apparatus according to claim 7, wherein the correcting section calculates a relative ratio of the difference at least at the focal position and the first position, wherein the relative ratio of the difference is calculated by dividing the difference at least at the focal position and the first position by the difference at the focal position.

9. The optical measuring apparatus according to claim 8, wherein the correcting section determines a correction coefficient that corresponds to the relative ratio of the difference at least at the focal position and the first position, wherein the correction coefficient is calculated by dividing a measurement value at the focal position by a measurement value at least at the focal position and the first position.

10. The optical measuring method according to claim 5, further comprising:
detecting a first point in time at which the strength of the received-light signal becomes equal to a first threshold value and a second point in time at which the strength of the received-light signal becomes equal to a second threshold value as the measurement area is scanned with the beam of light at least at the focal position and the first position; and
determining the amount of change on the basis of the first point in time and the second point in time at least at the focal position and the first position.

11. The optical measuring method according to claim 10, further comprising:
calculating a difference between the first point in time and the second point in time at least at the focal position and the first position.

12. The optical measuring method according to claim 11, further comprising:
calculating a relative ratio of the difference at least at the focal position and the first position, wherein the relative ratio of the difference is calculated by dividing the difference at least at the focal position and the first position by the difference at the focal position.

13. The optical measuring method according to claim 12, further comprising:
determining a correction coefficient that corresponds to the relative ratio of the difference at least at the focal position and the first position, wherein the correction coefficient is calculated by dividing a measurement value at the focal position by a measurement value at least at the focal position and the first position.

14. The program for optical measuring processing according to claim 6, further comprising:
detecting a first point in time at which the strength of the received-light signal becomes equal to a first threshold value and a second point in time at which the strength of the received-light signal becomes equal to a second threshold value as the measurement area is scanned with the beam of light at least at the focal position and the first position; and
determining the amount of change on the basis of the first point in time and the second point in time at least at the focal position and the first position.

15. The program for optical measuring processing according to claim 14, further comprising:
calculating a difference between the first point in time and the second point in time at least at the focal position and the first position.

16. The program for optical measuring processing according to claim 15, further comprising:
calculating a relative ratio of the difference at least at the focal position and the first position, wherein the relative ratio of the difference is calculated by dividing the difference at least at the focal position and the first position by the difference at the focal position.

17. The program for optical measuring processing according to claim 16, further comprising:
determining a correction coefficient that corresponds to the relative ratio of the difference at least at the focal position and the first position, wherein the correction coefficient is calculated by dividing a measurement value at the focal position by a measurement value at least at the focal position and the first position.

* * * * *